(12) United States Patent
Wang et al.

(10) Patent No.: US 11,842,664 B2
(45) Date of Patent: Dec. 12, 2023

(54) APPARATUS FOR OUTPUTTING OPTICALLY-INPUT TEXTS AND METHOD FOR CONTROLLING SAME

(71) Applicant: SUZHOU LIANGXIN OPTOELECTRIC TECHNOLOGY CO., LTD, Suzhou (CN)

(72) Inventors: Yongjin Wang, Suzhou (CN); Kang Fu, Suzhou (CN)

(73) Assignee: Suzhou Liangxin Optoelectric Technology Co., Ltd., Suzhou (CN)

(*) Notice: Subject to any disclaimer, the term of this patent is extended or adjusted under 35 U.S.C. 154(b) by 0 days.

(21) Appl. No.: 17/829,304

(22) Filed: May 31, 2022

(65) Prior Publication Data
US 2022/0293026 A1    Sep. 15, 2022

Related U.S. Application Data

(63) Continuation of application No. PCT/CN2020/128344, filed on Nov. 12, 2020.

(30) Foreign Application Priority Data

Nov. 28, 2019    (CN) .......................... 201911189913.1

(51) Int. Cl.
*G09G 3/14* (2006.01)
*G06F 18/22* (2023.01)

(52) U.S. Cl.
CPC ............... *G09G 3/14* (2013.01); *G06F 18/22* (2023.01)

(58) Field of Classification Search
CPC .. G09G 3/14; G09G 5/24; G06F 18/22; G06F 9/451; Y02D 30/70; H04B 10/116
See application file for complete search history.

(56) References Cited

U.S. PATENT DOCUMENTS

| 2016/0034038 | A1 | 2/2016 | Duan | |
| 2016/0380697 | A1* | 12/2016 | Kikuchi | H04B 10/116 |
| | | | | 398/118 |
| 2020/0177277 | A1* | 6/2020 | Seyvet | H04B 10/116 |

FOREIGN PATENT DOCUMENTS

| CN | 102694595 A | 9/2012 |
| CN | 103729096 A | 4/2014 |

(Continued)

OTHER PUBLICATIONS

International Search Report of International Application No. PCT/CN2020/128344 dated Feb. 10, 2021 with English translation, (4p).

*Primary Examiner* — Amit Chatly
(74) *Attorney, Agent, or Firm* — Arch & Lake LLP

(57) ABSTRACT

The present disclosure relates to an apparatus for outputting optically-input texts and a method controlling thereof. The apparatus includes: a light source array, including a plurality of light-emitting diodes disposed in an array; a driver, connected to all the light-emitting diodes in the light array, and configured to detect whether each of the light-emitting diodes has detected a drive optical signal from the outside, and drives the corresponding light-emitting diode to be turned on in response to detecting that the drive optical signal has been detected from the outside; a processor, connected to the light source array and the driver, and configured to recognize a target pattern formed by all the light-emitting diodes that have been turned on; and a controller, including a display screen, and configured to determine a text matching the target pattern as an output text, and displays the output text on the display screen.

12 Claims, 5 Drawing Sheets

(56) References Cited

FOREIGN PATENT DOCUMENTS

| CN | 104363564 A | 2/2015 |
| CN | 108471329 A | 8/2018 |
| CN | 111142985 A | 5/2020 |

\* cited by examiner

001
APPARATUS FOR OUTPUTTING OPTICALLY-INPUT TEXTS AND METHOD FOR CONTROLLING SAME

CROSS-REFERENCE TO RELATED APPLICATIONS

This application is a continuation application of PCT application No. PCT/CN2020/128344 filed on Nov. 28, 2019, which is based upon and claims priority to Chinese Patent Application No. 201911189913.1 filed on Nov. 28, 2019, the entire disclosures thereof are incorporated herein by reference for all purposes.

TECHNICAL FIELD

The present disclosure relates to the technical fields of illumination, display, and optical communication, and in particular, relates to an apparatus for outputting optically-input texts and a method for controlling the same.

BACKGROUND

Visible light communication (VLC) is a novel, short-range and high-speed wireless communication technology developed based on light-emitting diode (LED) and the like technologies. In the VLC, an LED is used as a light source, atmosphere or water is used as a propagation medium, information is transmitted by emitting visible light signals that are invisible to naked eyes and flicker at a high speed, and the visible light signals are converted at a receiver end into photoelectrical signals using a photodiode (PD), and electrical signals are received, regenerated, and demodulated, such that information transmission is implemented. Compared with traditional radio frequency communication, the VLC has the advantages of low energy consumption, low cost in device purchase, and the like, conforming to the national energy-saving and emission-reduction strategies; and the VLC causes no electromagnetic pollution, no mutual interference is present between visible light wavelengths and radio frequency signals, no hazard is caused to human eyes, and spectrum may be used with no need of authorization. In addition, the VLC is suitable for use in information security fields, and as long as the visible light is blocked, information in the VLC communication network may not leak, thereby achieving a high security. In view of the above factors, the VLC is well recognized as the most promising communication technology, and has become a hot subject for researches at home and abroad.

However, at present, the VLC has poor smartness and limited application fields. For example, the VLC may not be combined with smart display and smart display screens, or the like. Accordingly, how to improve the smartness of the VLC and expand the application fields of the VLC is a technical problem to be urgently solved currently.

SUMMARY

The present disclosure provides an apparatus for outputting optically-input texts, and a method for controlling the same, to solve the problem in the related art that smartness of the VLC is poor and to expand application fields of the VLC.

In a first aspect, the present disclosure provides an apparatus for outputting optically-input texts. The apparatus includes: a light source array, including a plurality of light-emitting diodes that are disposed in an array; a driver which consists of a plurality of power semiconductor components, connected to all the light-emitting diodes in the light array, and configured to detect whether each of the light-emitting diodes has detected a drive optical signal from the outside, and drives the corresponding light-emitting diode to be turned on in response to the detection of the drive optical signal that has been detected from the outside; a processor, connected to the light source array and the driver, and configured to capture a target pattern formed by all the light-emitting diodes that have been turned on; and a controller which consists of a plurality of sensors, actuators and basic control logic, including a display screen, and configured to determine a text matching the target pattern as an output text, and display the output text on the display screen.

In a second aspect, the present disclosure further provides a method for controlling an apparatus for outputting optically-input texts. The method includes: forming a light source array, wherein the light source array includes a plurality of light-emitting diodes that are disposed in an array; detecting whether each of the light-emitting diodes has detected a drive optical signal from the outside, and driving the corresponding light-emitting diode to be turned on in response to the detection of the drive optical signal that has been detected from the outside; recognizing a target pattern that formed by all the light-emitting diodes that have been turned on; and determining a text matching the target pattern as an output text, and displaying the output text on a display screen.

DETAILED DESCRIPTION

Hereinafter, specific embodiments of an apparatus for outputting optically-input texts and a method for controlling the same according to the present disclosure are described in detail with reference to the accompanying drawings.

Figure 1:
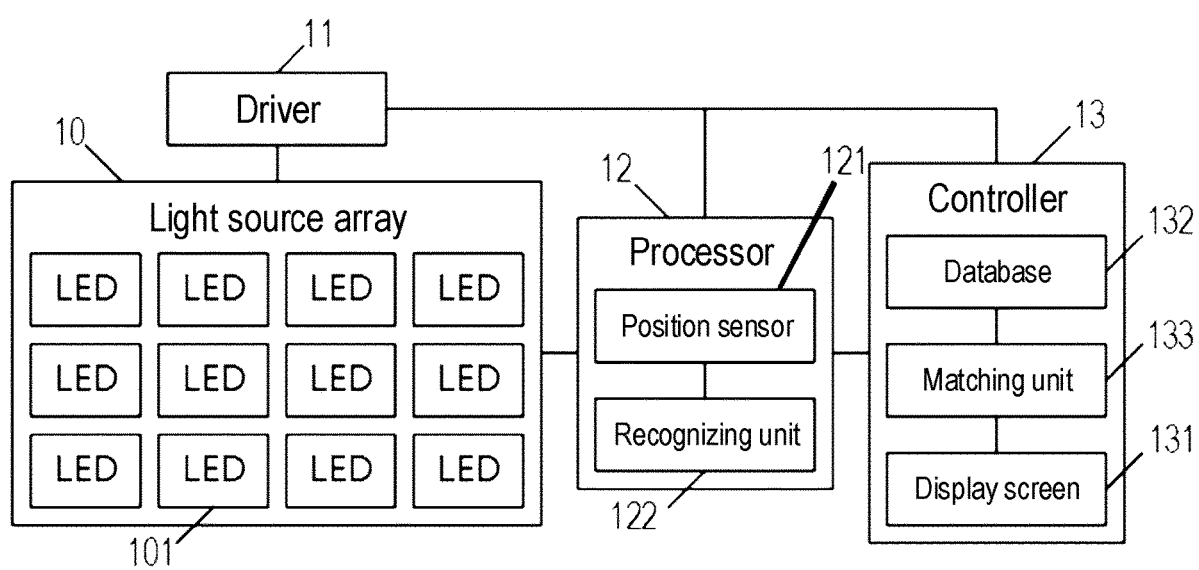
FIG. 1 is a structural block diagram of an apparatus for outputting optically-input texts according to a specific embodiment of the present disclosure.

A specific embodiment of the present disclosure provides an apparatus for outputting optically-input texts. FIG. 1 is a structural block diagram of the apparatus for outputting optically-input texts according to this embodiment. As illustrated in FIG. 1, the apparatus for outputting optically-input texts according to this embodiment includes:

a light source array 10, including a plurality of light-emitting diodes 101 that are disposed in an array;

a driver 11, connected to all the light-emitting diodes 101 in the light array 10, and configured to detect whether each of the light-emitting diodes 101 has detected a drive optical signal from the outside, and drive the corresponding light-emitting diode 101 to be turned on in response to detecting that the drive optical signal has been detected from the outside;
a processor 12, connected to the light source array 10 and the driver 11, and configured to recognize a target pattern collaboratively formed by all the turned-on light-emitting diodes 101; and
a controller 13, including a display screen 131, and configured to determine a text matching the target pattern as an output text, and display the output text on the display screen 131.

Figure 2:
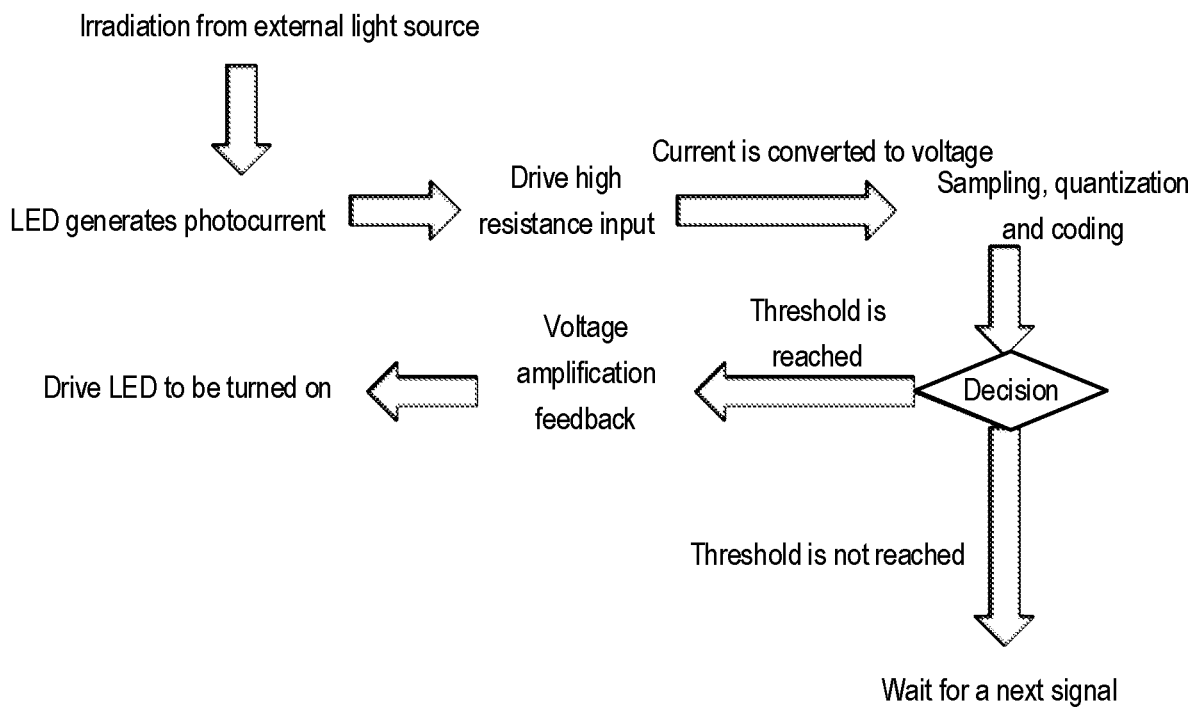
FIG. 2 is a logical flowchart of a process of optically inputting texts according to a specific embodiment of the present disclosure.

FIG. 2 is a logical flowchart of a process of optically inputting texts according to an embodiment of the present disclosure. Specifically, in an initial state, all the light-emitting diodes 101 in the light source array 10 are turned on (a non-light emitting state). When a user irradiates one of the light-emitting diodes 101 in the light source array 10 using a light source (for example, a flashlight of a mobile phone, a laser pen, or the like) on an external terminal, the light-emitting diode 101 receives an optical signal, and converts the optical signal to a current signal (that is, a photocurrent). Due to an internal resistance of the light-emitting diode 101 and a high resistance of a drive port of the light-emitting diode 101, the current signal is converted to an analog voltage signal. Afterwards, the analog voltage signal is sampled, quantization and coding. In the case that the received optical signal is a drive optical signal; the driver 11 supplies a feedback voltage to turn on the light-emitting diode 101. In the case that the received optical signal is not the drive optical signal, the light-emitting diode 101 remains in an off state and continues detecting optical signals.

In the case that the user successively irradiates, using the light source on the external terminal, the light-emitting diodes 101 in the light source array 10 of the apparatus for outputting optically-input texts, the light-emitting diodes 101 are successively turned on, such that a process of optically inputting texts is implemented. The processor 12 recognizes a pattern collaboratively formed by all the light-emitting diodes 101 that have been turned on, and determines the pattern as the target pattern. Afterwards, the controller 13 selects a text matching the target pattern as an output text, and displays the output text on the display screen 131, thereby implementing the process of text output. In this specific embodiment, remote input is implemented by virtue of the optical signal, the input content is automatically recognized, and optically-input content is displayed on the display screen in the form of texts. In this way, smartness of the VLC is greatly improved, and applications of the VLC are expanded, for example, the VLC may be applied to smart display and illumination of an array of light-emitting diodes, smart display screens of terminals, and the like fields. The term "a plurality of" in the embodiments of the present disclosure refers to two or more than two.

Optionally, the processor 12 includes:
a position sensor 121, configured to acquire position information of all the turned-on light-emitting diodes in the light source array;
a recognizing unit 122, connected to the position sensor 121, and configured to recognize, based on the position information, the target pattern collaboratively formed by all the turned-on light-emitting diodes.

Figure 4:
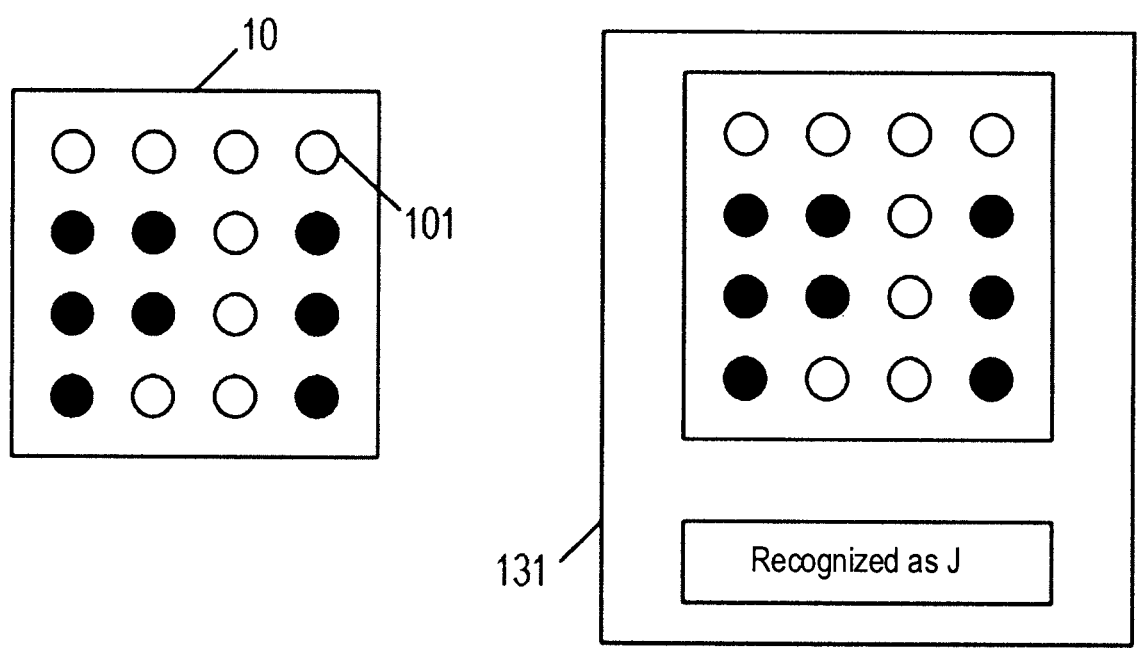
FIG. 4 is a schematic diagram of an operating process of an apparatus for outputting optically-input texts according to a specific embodiment of the present disclosure.

FIG. 4 is a flowchart of operation of an apparatus for outputting optically-input texts according to a specific embodiment of the present disclosure. In left and right parts in FIG. 4, white circles represent light-emitting diodes that are in an on state, and black circles represent light-emitting diodes that are in an off state. For example, as illustrated in FIG. 4, the light source array 10 includes four rows and four columns of light-emitting diodes 101. When the user successively irradiates the light-emitting diodes in the first row and second column, the first row and third column, the first row and fourth column, the second row and third column, the third row and third column, the fourth row and third column, and the fourth row and second column, these light-emitting diodes are successively turned on, as illustrated in the left part in FIG. 4. The position sensor 121 acquires position information and state information thereof (including the on-state and the off-state) of each of the light-emitting diodes 101 in the light source array 10, and display positions and states of all the light-emitting diodes 101 in the light source array 10 on the display screen 131. As illustrated in the right part in FIG. 4, the position and the state of each of the light-emitting diodes in the light source array 10 are represented in a planar two-dimensional map. The recognizing unit 122 recognizes, according to the planar two-dimensional map, the pattern collaboratively formed by all the light-emitting diodes 101 that have been turned on, for example, a "J"-shaped pattern in the left part in FIG. 4. The position information according to this specific embodiment may be a coordinate position of the light-emitting diode 101 in the light source array 10. Described above is merely an example, and a person skilled in the art may also recognize the pattern collaboratively formed by all the light-emitting diodes 101 that have been turned on by selecting another recognition approach according to actual needs.

Optionally, the controller 13 further includes:
a database 132, configured to store a plurality of predetermined patterns, and a plurality of texts in one-to-one correspondence to the plurality of predetermined patterns; and
a matching unit 133, configured to select a predetermined pattern matching the target pattern, and determine the text corresponding to the selected predetermined pattern as the output text.

Figure 3:
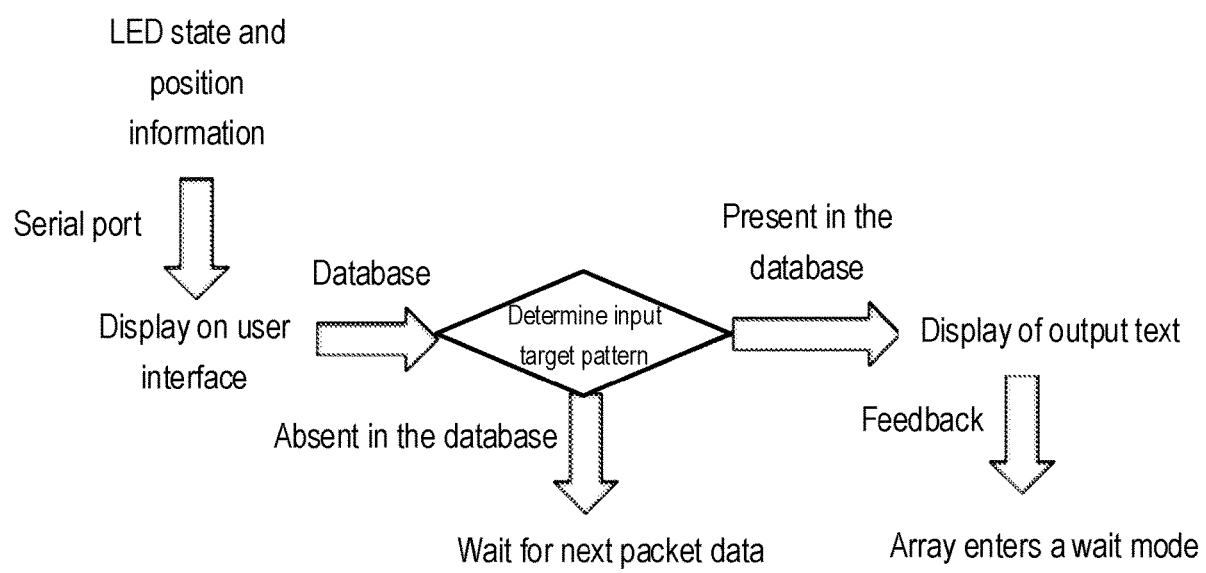
FIG. 3 is a logical flowchart of a process of outputting texts according to a specific embodiment of the present disclosure.

FIG. 3 is a logical flowchart of a process of outputting texts according to an embodiment of the present disclosure. For example, the database 132 includes a database configured to store the plurality of predetermined patterns and the plurality of texts in one-to-one correspondence to the plurality of predetermined patterns. As illustrated in FIG. 3, in the case that the target pattern is recognized, the matching unit 132 may compare the target pattern with the plurality of predetermined patterns stored in the database, and determine a text corresponding to a predetermined pattern matching the target pattern as the output text. For example, in the case that the target pattern is the "J"-shaped pattern as illustrated in FIG. 4, and a text, that is, a letter "J", corresponding to the pattern is matched from the database, "The pattern is recognized as J" is displayed in a text display box on the display screen 131. In the case that the database does not include the predetermined pattern matching the target pattern, the output text is not displayed on the display screen 131 or "Unrecognizable" is displayed. That is, no information is displayed in the text display box on the display screen 131 or "Unrecognizable" is displayed in the text display box.

A person skilled in the art may select a specific method for determining whether the target pattern matches any of the predetermined patterns. For example, the matching may be determined according to a similarity between the target pattern and the predetermined pattern.

Optionally, the controller 13 is further connected to the driver 11, and is configured to detect whether the output text is displayed on the display screen 131, and control, by the driver 11, all the light-emitting diodes 101 in the light source array 10 to be turned off in response to detecting that the output text is displayed on the display screen 131.

Specifically, upon completion of display of the output text, the controller 13 feeds back a feedback electrical signal to the driver 11, and the driver 11 controls, based on the feedback electrical signal, all the light-emitting diodes 101 in the light source array 10 to be turned off, waiting for a next process of optically inputting texts.

A person skilled in the art may select the specific type of the text according to actual needs, which is not limited in the specific embodiment of the present disclosure. Optionally, the text is a combination of one or more of digits, letters, and characters.

Figure 5:
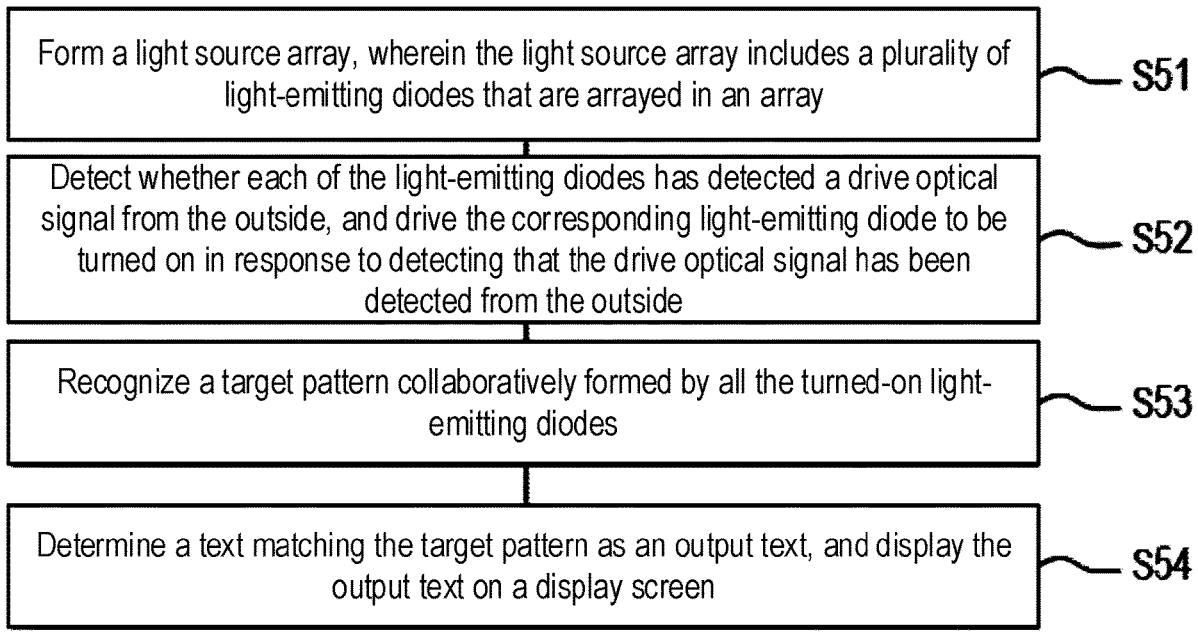
FIG. 5 is a flowchart of a method for controlling an apparatus for outputting optically-input texts according to a specific embodiment of the present disclosure.

Further, a specific embodiment of the present disclosure provides a method for controlling an apparatus for outputting optically-input texts. FIG. 5 is a schematic flowchart of the method for controlling the apparatus for outputting optically-input texts according to this embodiment. The specific structure of the apparatus for outputting optically-input texts according to this specific embodiment may be as illustrated in FIG. 1 to FIG. 4. As illustrated in FIG. 1 to FIG. 5, the method for controlling the apparatus for outputting optically-input texts includes the following steps.

step S51: forming a light source array 10, wherein the light source array 10 includes a plurality of light-emitting diodes 101 that are arrayed in an array;

step S52: detecting whether each of the light-emitting diodes 101 has detected a drive optical signal from the outside, and driving the corresponding light-emitting diode 101 to be turned on in response to detecting that the drive optical signal has been detected from the outside;

step S53: recognizing a target pattern collaboratively formed by all the turned-on light-emitting diodes 101; and step S54: determining a text matching the target pattern as an output text, and displaying the output text on a display screen 131.

Optionally, recognizing the target pattern collaboratively formed by all the turned-on light-emitting diodes 101 includes:

acquiring position information of all the turned-on light-emitting diodes 101 in the light source array 10; and recognizing, based on the position information, the target pattern collaboratively formed by all the turned-on light-emitting diodes 101.

Optionally, determining the text matching the target pattern as the output text includes:

storing a plurality of predetermined patterns, and a plurality of texts in one-to-one correspondence to the plurality of predetermined patterns; and selecting a predetermined pattern matching the target pattern, and determining the text corresponding to the selected predetermined pattern as the output text.

Optionally, upon displaying the output text on the display screen, the method further includes:

driving all the light-emitting diodes 101 in the light source array 10 to be turned off.

Optionally, the text is a combination of one or more of digits, letters, and characters.

In the apparatus for outputting optically-input texts and the method for controlling the same according to the specific embodiments of the present disclosure, a light source array including a plurality of light-emitting diodes that are arranged in an array is provided; by virtue of coexistence of light emission and detection of the light-emitting diodes, the light-emitting diodes are driven to be turned on in response to the light-emitting diodes detecting drive optical signals from the outside; and a text matching the target pattern is determined as an output text by recognizing a target pattern collaboratively formed by all the turned-on light-emitting diodes, and the output text is displayed on a display screen. In this way, the whole process of inputting optical signals and outputting texts is implemented, smartness of the VLC is improved, and application fields of the VLC are expanded.

Optionally, the apparatus includes: a position sensor, configured to acquire position information of all the turned-on light-emitting diodes in the light source array; a recognizing unit, connected to the position sensor, and configured to capture, based on the position information, the target pattern formed by all light-emitting diodes that have been turned on.

Optionally, the controller further includes: a database, configured to store a plurality of predetermined patterns, and a plurality of texts in one-to-one correspondence to the plurality of predetermined patterns; and a matching unit, configured to select a predetermined pattern matching the target pattern, and determine the text corresponding to the selected predetermined pattern as the output text.

Optionally, the controller is further connected to the driver, and is configured to detect whether the output text is displayed on the display screen, and controls, directed by the driver, all the light-emitting diodes in the light source array to be turned off when the output text is displayed on the display screen.

Optionally, the text is a combination of one or more of digits, letters, and characters.

Optionally, recognizing a target pattern that formed by all the light-emitting diodes that have been turned on includes:

acquiring the position information of all the turned-on light-emitting diodes in the light source array; and recognizing, based on the position information, the target pattern formed by all the turned-on light-emitting diodes.

Optionally, determining the text matching the target pattern as the output text includes:

storing a plurality of predetermined patterns, and a plurality of texts in one-to-one correspondence to the plurality of predetermined patterns; and selecting a predetermined pattern matching the target pattern, and determining the text corresponding to the selected predetermined pattern as the output text.

Optionally, upon displaying the output text on the display screen, the method further includes:

driving all the light-emitting diodes in the light source array to be turned off.

Optionally, the text is a combination of one or more of digits, letters, and characters.

In the apparatus for outputting optically-input texts and the method for controlling the same according to the present disclosure, a light source array including a plurality of light-emitting diodes that are arranged in an array is provided; by virtue of coexistence of light emission and detection of the light-emitting diodes, the light-emitting diodes are driven to be turned on in response to the light-emitting diodes detecting drive optical signals from the outside; and a text matching the target pattern is determined as an output text by recognizing a target pattern formed by all the light-emitting diodes that have been turned-on, and the output text is displayed on a display screen. In this way, the whole process of inputting optical signals and outputting texts is implemented, smartness of the VLC is improved, and application fields of the VLC are expanded.

Described above are preferred embodiments of the present disclosure. It should be noted that persons of ordinary skill in the art may derive other improvements or polishments without departing from the principles of the present disclosure. Such improvements and polishments shall be deemed as falling within the protection scope of the present disclosure.

What is claimed is:

1. An apparatus for outputting optically-input texts, comprising:
   a light source array, comprising a plurality of light-emitting diodes that are arranged in an array;
   a driver, connected to all the light-emitting diodes in the light array, and configured to detect whether each of the light-emitting diodes has detected a drive optical signal from the outside, and drive the corresponding light-emitting diode to be turned on in response to detecting that the drive optical signal has been detected from the outside;
   a processor, connected to the light source array and the driver, and configured to recognize a target pattern formed by all the light-emitting diodes that have been turned on; and
   a controller, comprising a display screen, and configured to determine a text matching the target pattern as an output text, and display the output text on the display screen,
   wherein the controller feeds back a feedback electrical signal to the driver upon completion of displaying the output text,
   wherein the driver, in response to the feedback electrical signal, controls the plurality of light-emitting diodes in the light source array to be turned off, and waits for a next process of optically inputting texts.

2. The apparatus according to claim 1, wherein the processor comprises:
   a position sensor, configured to acquire position information of all the turned-on light-emitting diodes in the light source array;
   a recognizing unit, connected to the position sensor, and configured to recognize, based on the position information, the target pattern formed by all the light-emitting diodes that have been turned on.

3. The apparatus according to claim 1, wherein the controller further comprises:
   a database, configured to store a plurality of predetermined patterns, and a plurality of texts in one-to-one correspondence to the plurality of predetermined patterns; and
   a matching unit, configured to select a predetermined pattern matching the target pattern, and determine the text corresponding to the selected predetermined pattern as the output text.

4. The apparatus according to claim 3, wherein the controller, in response to determining that the database does not include the selected predetermined pattern matching the target pattern, display "Unrecognizable" on the display screen.

5. The apparatus according to claim 1, wherein the controller is further connected to the driver, and is configured to detect whether the output text is displayed on the display screen, and control, by the driver, all the light-emitting diodes in the light source array to be turned off in response to detecting that the output text is displayed on the display screen.

6. The apparatus according to claim 1, wherein the text is a combination of one or more of digits, letters, and characters.

7. A method for controlling an apparatus for outputting optically-input texts, comprising:
   forming a light source array, wherein the light source array comprises a plurality of light-emitting diodes that are arrayed in an array;
   detecting whether each of the light-emitting diodes has detected a drive optical signal from the outside, and driving the corresponding light-emitting diode to be turned on in response to detecting that the drive optical signal has been detected from the outside;
   recognizing a target pattern formed by all the light-emitting diodes that have been turned on;
   determining a text matching the target pattern as an output text, and displaying the output text on a display screen;
   feeding back a feedback electrical signal upon completion of displaying the output text; and
   in response to the feedback electrical signal, controlling the plurality of light-emitting diodes in the light source array to be turned off, and waiting for a next process of optically inputting texts.

8. The method according to claim 7, wherein recognizing the target pattern formed by all the light-emitting diodes that have been turned on comprises:
   acquiring position information of all the turned-on light-emitting diodes in the light source array; and
   recognizing, based on the position information, the target pattern formed by all the light-emitting diodes that have been turned on.

9. The method according to claim 7, wherein determining the text matching the target pattern as the output text comprises:
   storing a plurality of predetermined patterns, and a plurality of texts in one-to-one correspondence to the plurality of predetermined patterns; and
   selecting a predetermined pattern matching the target pattern, and determining the text corresponding to the selected predetermined pattern as the output text.

10. The method according to claim 9, wherein determining the text matching the target pattern as the output text comprises:
    in response to determining that the database does not include the selected predetermined pattern matching the target pattern, displaying "Unrecognizable" on the display screen.

11. The method according to claim 7, wherein upon displaying the output text on the display screen, the method further comprises:
    driving all the light-emitting diodes in the light source array to be turned off.

12. The method according to claim 7, wherein the text is a combination of one or more of digits, letters, and characters.

* * * * *